(12) United States Patent
Mahajan et al.

(10) Patent No.: US 10,031,747 B2
(45) Date of Patent: Jul. 24, 2018

(54) SYSTEM AND METHOD FOR REGISTRATION OF A CUSTOM COMPONENT IN A DISTRIBUTED COMPUTING PIPELINE

(71) Applicant: Impetus Technologies, Inc., Los Gatos, CA (US)

(72) Inventors: Aashu Mahajan, Los Gatos, CA (US); Kumar Gaurav, Noida (IN); Nitin Kumar, Noida (IN); Punit Shah, Los Gatos, CA (US); Saurabh Dutta, Indore (IN)

(73) Assignee: IMPETUS TECHNOLOGIES, INC., Los Gatos, CA (US)

( * ) Notice: Subject to any disclaimer, the term of this patent is extended or adjusted under 35 U.S.C. 154(b) by 0 days.

(21) Appl. No.: 15/380,552

(22) Filed: Dec. 15, 2016

(65) Prior Publication Data

US 2017/0168814 A1 Jun. 15, 2017

Related U.S. Application Data

(60) Provisional application No. 62/267,432, filed on Dec. 15, 2015.

(51) Int. Cl.
*G06F 9/44* (2018.01)
*G06F 8/71* (2018.01)
(Continued)

(52) U.S. Cl.
CPC ............... *G06F 8/71* (2013.01); *G06F 8/65* (2013.01); *G06F 3/0481* (2013.01); *G06F 17/2705* (2013.01)

(58) Field of Classification Search
CPC ..................... G06F 8/71; G06F 8/65
(Continued)

(56) References Cited

U.S. PATENT DOCUMENTS 6,237,135 B1 * 5/2001 Timbol ............... G06F 8/34
717/107
6,256,773 B1 * 7/2001 Bowman-Amuah ..... G06F 8/71
707/999.202

(Continued)

OTHER PUBLICATIONS

Pareek et al, "Striim: A streaming analytics platform for real-time business decisions", ACM, pp. 1-8, 2017.*
(Continued)

*Primary Examiner* — Anil Khatri
(74) *Attorney, Agent, or Firm* — Hayes Sololoway P.C.

(57) ABSTRACT

The present disclosure relates to system(s) and method(s) for registration of a custom component on a Stream Analytics Platform. The system is configured to receive a program file and one or more registration instructions corresponding to the custom component, from a primary user of the Stream Analytics Platform. Further, a program code may be extracted from the program file by parsing the program file. Further, the system is configured to register the program code as a registered custom component, on the Stream Analytics Platform based on the one or more registration instructions. Once registered, the registered custom component is available over a Graphical User Interface (GUI) of the Stream Analytics Platform. The system enables at least the primary user or a set of secondary users of the Stream Analytics platform to use the registered custom component, based on the one or more registration instructions, for designing a distributed processing pipeline.

14 Claims, 9 Drawing Sheets

(51) Int. Cl.
*G06F 8/65* (2018.01)
*G06F 3/0481* (2013.01)
*G06F 17/27* (2006.01)

(58) Field of Classification Search
USPC .................. 717/120–124, 107–108, 116
See application file for complete search history.

(56) References Cited

U.S. PATENT DOCUMENTS

| | | | | |
|---|---|---|---|---|
| 6,735,737 | B2* | 5/2004 | Sankaran | H03M 13/1515 |
| | | | | 714/781 |
| 7,020,697 | B1 | 3/2006 | Goodman et al. | |
| 7,712,077 | B2* | 5/2010 | Carusi | G06F 9/465 |
| | | | | 709/219 |
| 8,291,006 | B2* | 10/2012 | Andrade | G06F 9/5066 |
| | | | | 709/201 |
| 8,413,115 | B1* | 4/2013 | Surprise | G06F 8/10 |
| | | | | 709/230 |
| 8,510,729 | B2* | 8/2013 | Weissman | G06F 8/71 |
| | | | | 717/120 |
| 8,606,892 | B2* | 12/2013 | Mallur | G06F 8/65 |
| | | | | 709/203 |
| 8,930,879 | B2* | 1/2015 | Fernandez | G06F 8/20 |
| | | | | 717/100 |
| 9,038,017 | B2* | 5/2015 | Premkumar | G06F 8/24 |
| | | | | 715/763 |
| 9,098,863 | B2* | 8/2015 | Cardon | G06Q 30/0204 |
| 9,356,986 | B2* | 5/2016 | Pingenot | H04L 65/4069 |
| 9,542,655 | B1* | 1/2017 | Chernis | G06N 99/005 |
| 9,600,155 | B2* | 3/2017 | Hale | G06F 9/4443 |
| 9,749,430 | B2* | 8/2017 | Nano | H04L 67/22 |
| 2016/0261727 | A1 | 9/2016 | Yang et al. | |
| 2016/0300157 | A1 | 10/2016 | Sankaradas et al. | |

OTHER PUBLICATIONS

Hirzel et al, "SPL: An Extensible Language for Distributed Stream Processing", ACM Transactions on Programming Languages and Systems, vol. 39, No. 1, Article 5, pp. 1-39, 2017.*

Lourenço et al, "Economically-Efficient Sentiment Stream Analysis", ACM, pp. 637-646, 2014.*

Flouris et al, "FERARI: A Prototype for Complex Event Processing over Streaming Multi-cloud Platforms", ACM, pp. 2093-2096, 2016.*

Gill et al, "Component Adaptation Process and Adaptability Viewpoints", ACM, pp. 1-3, 2009.*

Bures et al, "Using a product line for creating component systems", ACM, pp. 501-508, 2009.*

Moreno, "Creating Custom Containers with Generative Techniques", ACM, pp. 29-38, 2006.*

Christian Bockermann and Hendrik Blom, "The streams Framework", 2012, 65 pages.

* cited by examiner

Components registered successfully

Upload Jar: Register components by uploading jar. You can use registered components in your pipelines.

Search

| components | *Owner | Version |
|---|---|---|
| customSampleIterator Executor | SuperUser | 1 |

Showing 1 to 1 of 1 entries

SYSTEM AND METHOD FOR REGISTRATION OF A CUSTOM COMPONENT IN A DISTRIBUTED COMPUTING PIPELINE

CROSS-REFERENCE TO RELATED APPLICATIONS AND PRIORITY

The present application claim priority from U.S. Provisional Patent Application No. 62/267,432, entitled "System and method for registration of a custom component in a distributed computing pipeline" filed Dec. 15, 2015, the entire disclosure of which is incorporated herein by reference.

TECHNICAL FIELD

The present disclosure described herein, in general, relates to distributed computing, and more particularly to a system and method for registration of a custom component on a Stream Analytics Platform.

BACKGROUND

A Stream Analytics Platforms may be implemented over Apache™ Storm or Apache™ Spark engines for designing a distributed processing pipeline. The distributed processing pipeline may be created using multiple channel components and processor component. The channel components and processor components are available on a Graphical User Interface (GUI) provided for creating the distributed processing pipeline. A user may drag and drop the components over a canvas of the GUI to create the distributed processing pipeline. The distributed processing pipeline created may be executed by the cluster of computing resources associated with the Apache™ Storm/Apache™ Spark engine. It must be understood that since the components are having the specified tasks/functionalities, the components may not be utilized for executing any custom logic to be executed in the Apache™ Storm/Apache™ Spark engine. For example, the user may want to develop a custom logic that determines whether a loan may be granted to a customer of a bank based upon the current salary of the customer. In order to support such scenario, a custom component is provided in the distributed processing pipeline that may be utilized for configuring the custom logic as desired by the user.

However, it is observed that the user need to re-perform steps for configuring the same custom logic on a custom component of another distributed processing pipeline. That is, if the user creates a new distributed processing pipeline and desires to execute the same custom logic as above (i.e. determining whether a loan may be granted to a customer of a bank based upon the current salary of the customer) on the new distributed processing pipeline, the user may have to re-upload the program file on the new distributed processing pipeline, re-extract the program code, corresponding to the custom component, from the program file, to execute the custom logic on the stream analytics platform. In other words, it must be understood that for executing the same custom logic on different distributed processing pipelines, the user has to repeat the steps of uploading the program file, configuring the custom component, and extracting the program code, corresponding to the custom logic in the program file uploaded, on the custom component while configuring the custom component. It must be understood that such repetition of the above steps for execution of the same custom logic is onerous, time consuming and undesirable.

Further, the user may create errors while re-performing the same tasks. Specifically, the user may conduct mistake while passing arguments corresponding to a function of the custom logic during the configuration of the custom component.

SUMMARY

This summary is provided to introduce aspects related to systems and methods for registration of a custom component on a Stream Analytics Platform and the concepts are further described below in the detailed description. This summary is not intended to identify essential features of subject matter nor is it intended for use in determining or limiting the scope of the subject matter.

In one embodiment, a system for registration of a custom component on a Stream Analytics Platform is illustrated. The system comprises a memory and a processor coupled to the memory, wherein the processor is configured to execute programmed instructions stored in the memory. In one embodiment, the processor may execute programmed instructions stored in the memory for receiving a program file and one or more registration instructions corresponding to the custom component, from a primary user of the Stream Analytics Platform. Further, the processor may execute programmed instructions stored in the memory for parsing the program file to extract a program code, of the custom component, from the program file. Further, the processor may execute programmed instructions stored in the memory for registering the program code as a registered custom component, on the Stream Analytics Platform based on the one or more registration instructions. The registered custom component may be available over a Graphical User Interface (GUI) of the Stream Analytics Platform. In one embodiment, the processor may execute programmed instructions stored in the memory for enabling at least one of the primary user or a set of secondary users of the Stream Analytics platform to use the registered custom component, based on the one or more registration instructions, for designing a distributed processing pipeline.

In one embodiment, a method for registration of a custom component on a Stream Analytics Platform is disclosed. The method may comprise receiving, by a processor, a program file and one or more registration instructions corresponding to the custom component, from a primary user of the Stream Analytics Platform. Further, the method may comprise parsing, by the processor, the program file to extract a program code, of the custom component, from the program file. Further, the method may comprise registering, by the processor, the program code as a registered custom component, on the Stream Analytics Platform based on the one or more registration instructions. The registered custom component is available over a Graphical User Interface (GUI) of the Stream Analytics Platform. In one embodiment, the method may comprise enabling, by the processor, at least the primary user or a set of secondary users of the Stream Analytics platform to use the registered custom component, based on the one or more registration instructions, for designing a distributed processing pipeline.

In one embodiment, a non-transitory computer readable medium embodying a program executable in a computing device for registration of a custom component on a Stream Analytics Platform is disclosed. The program may comprise a program code for receiving a program file and one or more registration instructions corresponding to a custom component, from a primary user of a Stream Analytics Platform. Further, the program may comprise a program code for parsing the program file to extract a program code, of the custom component, from the program file. Finally, the program may comprise a program code for registering the program code as a registered custom component, on the Stream Analytics Platform based on the one or more registration instructions. The registered custom component is available over a Graphical User Interface (GUI) of the Stream Analytics Platform. In one embodiment, the program may comprise a program code for enabling at least the primary user or a set of secondary users of the Stream Analytics platform to use the registered custom component, based on the one or more registration instructions, for designing a distributed processing pipeline.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present subject matter relates to a system and method for registration of a custom component on a Stream Analytics Platform. The system is configured to communicate with the Stream Analytics platform. In one embodiment, the system is configured to receive a program file and registration instructions from a primary user of the Stream Analytics Platform. The program file may correspond to a program code of the custom component. The program code may be extracted by parsing the program file. Further, the system is configured to receive one or more registration instructions and register the program code as a registered custom component, on the Stream Analytics Platform. The registered custom component is available on the Graphical User Interface (GUI), of the Stream Analytics Platform. In one embodiment, the primary user or a set of secondary users of the Stream Analytics platform may use the registered custom component for designing a distributed processing pipeline.

While aspects of described system and method for registration of a custom component on a Stream Analytics Platform may be implemented in any number of different computing systems, environments, and/or configurations, the embodiments are described in the context of the following exemplary system.

Figure 1:
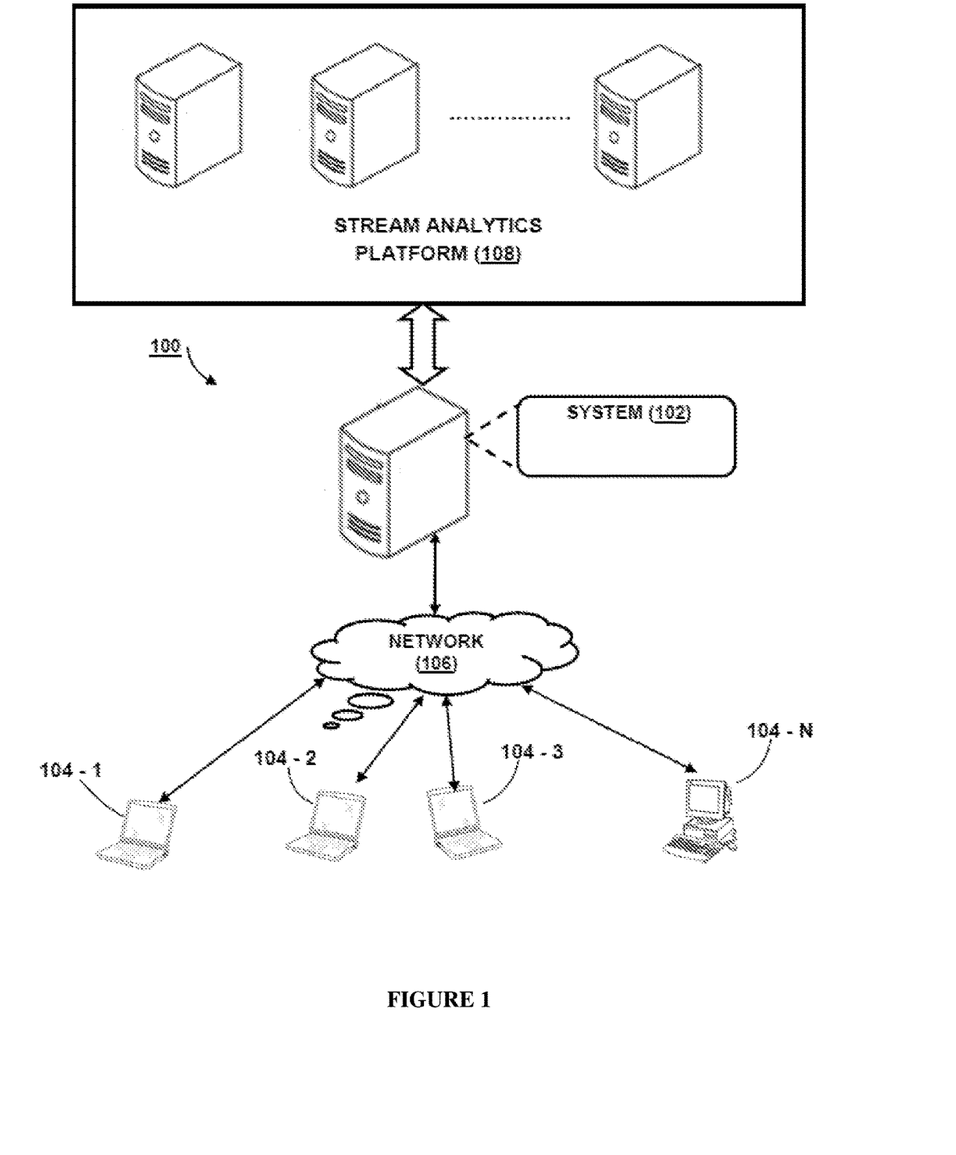
FIG. 1 illustrates a network implementation of a system for registration of a custom component on a Stream Analytics Platform, in accordance with an embodiment of the present subject matter.

Referring now to FIG. 1, a network implementation 100 of a system 102 for registration of a custom component on a Stream Analytics Platform 108 is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 is connected to the Stream Analytics Platform 108 by a wired or wireless communication channel. The Stream Analytics Platform 108 may comprise multiple computing machines. The Stream Analytics Platform 108 may be implemented over Apache™ Storm or Apache™ Spark engine. The system 102 for registration of the custom component on the Stream Analytics Platform 108 is further elaborated with respect to the FIG. 2.

Figure 2:
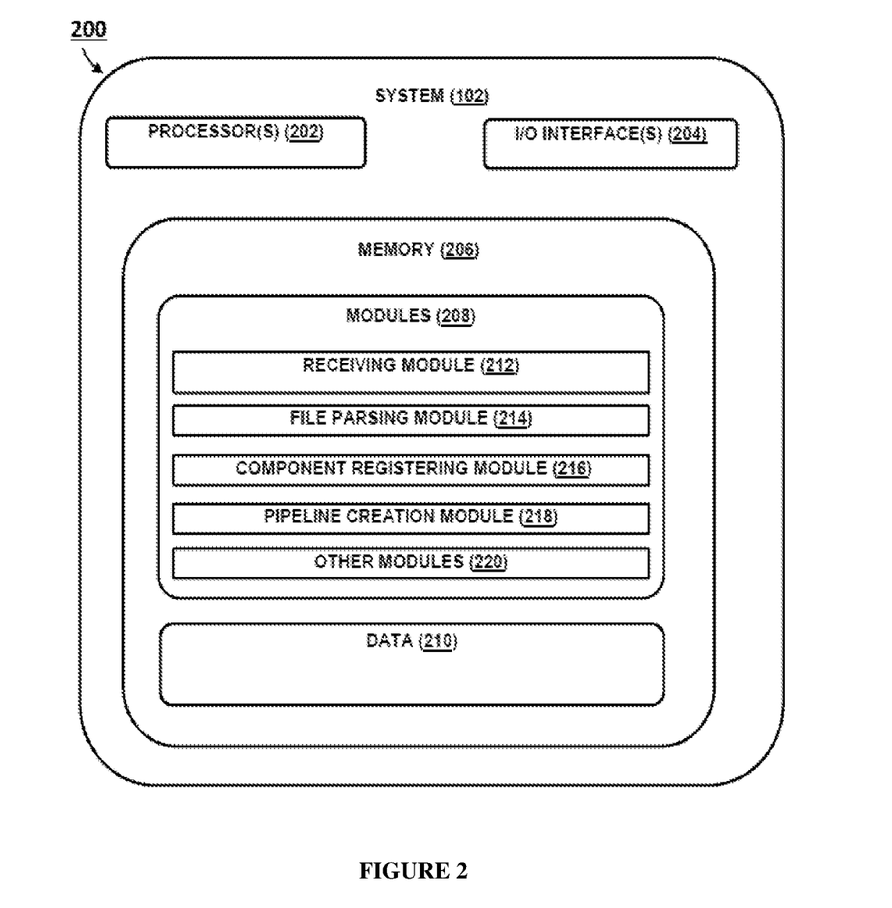
FIG. 2 illustrates architecture of the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 210. The modules 208 include routines, programs, objects, components, data structures, etc., which perform particular tasks or implement particular abstract data types.

In one implementation, the modules 208 may include a receiving module 212, a parsing module 214, a registering module 216, a pipeline creation module 218 and other modules 220. The other modules 220 may include programs or coded instructions that supplement applications and functions of the system 102. The data 210, amongst other things, serves as a repository for storing data processed, received, and generated by one or more of the modules 208. The detailed description of the system 102 is explained in detail as below.

In one embodiment, the receiving module 212 is configured to receive a program file and one or more registration instructions corresponding to the custom component, from a primary user of the Stream Analytics Platform 108. The program file may be a JAR (Java Archive) file. The JAR file is configured to maintain a set of classes associated with the custom component. The receiving module 212 is configured to enable the primary user to specify a main class, among the multiple classes, corresponding to the custom component.

Once the program file corresponding to the custom component is received, the file parsing module 214 is configured to parse the program file of the custom component. The program file corresponds to a program code for the custom component to be registered on the stream analytics platform. The program code is extracted from the program file, by parsing the program file. The program code corresponds to a set of classes. In one embodiment, the program file may be a jar file. The jar file may be parsed using ASM API. The ASM indicates a JAVA byte code manipulation and analysis framework.

Further, the component registering module 216 is configured to register the program code, corresponding to the custom component, as a registered custom component, on the Stream Analytics Platform 108 based on the one or more registration instructions. Once the custom component is registered, the registered custom component is available over a Graphical User Interface (GUI) of the Stream Analytics Platform for use by a primary user and a set of secondary users registered with the stream analytics platform 108. The registration instructions may correspond to one of registering the custom component as a local component or registering the custom component as a global component. In one embodiment, when the custom component is registered as a local component, the registered custom component is available for use only by the primary user. When the component is registered as a global component, the registered custom component is available for use by the primary user as well as a set of secondary users registered with the stream analytics platform.

In one embodiment, the registered custom component may be a channel component or a processor component. In one embodiment, the channel component is configured to read data from a set data sources. The set of data sources may include at least a queues, distributed file system, or TCP ports. Further, the processor component may be configured to implement user defined logic.

Further, the component registering module 216 is configured to enable at least one of the primary user or the set of secondary users to use the registered custom component based on the one or more registration instructions, for designing a distributed processing pipeline. Once the custom component is registered, the component registering module 216 is configured to enable the primary user to assign name to the registered custom component and to upload an icon for the registered custom component. The primary user may upload an icon for the registered custom component, using Image API. Further, the component registering module 216 is configured to enable at least the primary user or the set of secondary users to update the program code corresponding to the registered custom component or delete the registered custom component. When the program code associated with the registered custom component is updated, a new version of the registered custom component is generated at the stream analytics platform. It is to be noted that the primary user or the set of secondary users may use different versions of the same registered custom components for designing different data processing pipelines over the stream analytics platform. By enabling versioning of the registered custom component, the users of the stream analytics platform may dynamically program the registered custom component which is available for use in real-time.

In one embodiment, the program file may comprise a program code to enable a user to design input configuration needed during the custom component's usage in a pipeline. For example, a Database (DB) processor component, configured to write streaming data in the database, may have input configuration like host, port, database name, user, password, and alike. The component registering module 216 enables defining input configurations. Once the input configurations enables a secondary user to specify the input configuration such as host, port, database name, user, password, and alike at the time of adding the registered custom component into the pipeline.

Once the custom component is registered, the pipeline creation module 218 is configured to enable a palette and a canvas over Graphical User Interface (GUI) of the user devices associated with the primary user and the set of secondary users. The palette is configured to display a set of inbuilt components and the registered custom component. The canvas enables at least the primary user or the set of secondary users to drag and drop one or more components from the set of inbuilt components or the registered custom components for generating the distributed processing pipeline. The users may use different versions of the same registered custom component in order to design the distributed processing pipeline.

Figure 3:
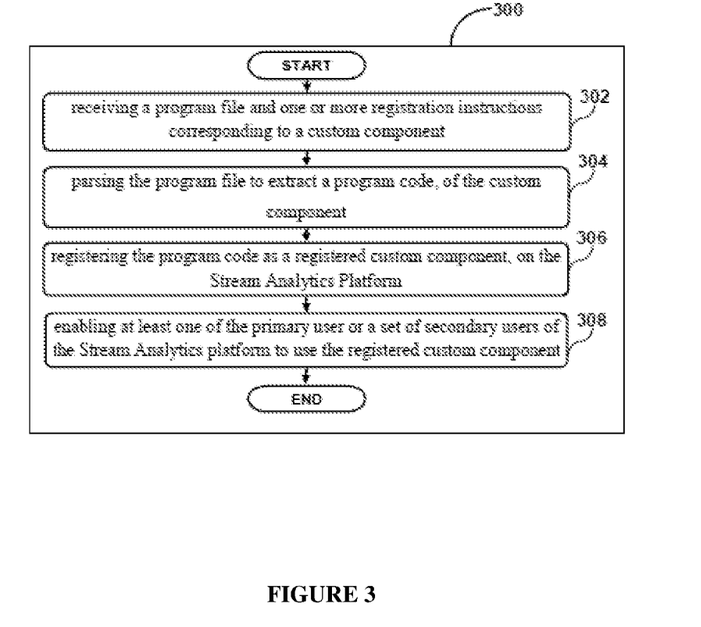
FIG. 3 illustrates a method for registration of the custom component on the Stream Analytics Platform, in accordance with an embodiment of the present subject matter.

Referring now to FIG. 3, a method 300 for registration of a custom component on a Stream Analytics Platform, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, the receiving module 212 is configured to receive a program file and one or more registration instructions corresponding to the custom component, from a primary user of the Stream Analytics Platform 108. The program file may be a JAR (Java Archive) file. The JAR file is configured to maintain a set of classes associated with the custom component. The receiving module 212 is configured to enable the primary user to specify a main class, among the multiple classes, corresponding to the custom component.

At block 304, once the program file corresponding to the custom component is received, the file parsing module 214 is configured to parse the program file of the custom component. The program file corresponds to a program code for the custom component to be registered on the stream analytics platform. The program code is extracted from the program file, by parsing the program file. The program code corresponds to a set of classes. In one embodiment, the program file may be a jar file. The jar file may be parsed using ASM API. The ASM indicates a JAVA byte code manipulation and analysis framework.

At block 306, the component registering module 216 is configured to register the program code, corresponding to the custom component, as a registered custom component, on the Stream Analytics Platform 108 based on the one or more registration instructions. Once the custom component is registered, the registered custom component is available over a Graphical User Interface (GUI) of the Stream Analytics Platform for use by a primary user and a set of secondary users registered with the stream analytics platform 108. The registration instructions may correspond to one of registering the custom component as a local component or registering the custom component as a global component. In one embodiment, when the custom component is registered as a local component, the registered custom component is available for use only by the primary user. When the component is registered as a global component, the registered custom component is available for use by the primary user as well as a set of secondary users registered with the stream analytics platform. In one embodiment, the registered custom component may be a channel component or a processor component. In one embodiment, the channel component is configured to read data from a set data sources. The set of data sources may include at least a queues, distributed file system, or TCP ports. Further, the processor component may be configured to implement user defined logic.

Further, the component registering module 216 is configured to enable at least one of the primary user or the set of secondary users to use the registered custom component based on the one or more registration instructions, for designing a distributed processing pipeline. Once the custom component is registered, the component registering module 216 is configured to enable the primary user to assign name to the registered custom component and to upload an icon for the registered custom component. The primary user may upload an icon for the registered custom component, using Image API. Further, the component registering module 216 is configured to enable at least the primary user or the set of secondary users to update the program code corresponding to the registered custom component or delete the registered custom component. When the program code associated with the registered custom component is updated, a new version of the registered custom component is generated at the stream analytics platform. It is to be noted that the primary user or the set of secondary users may use different versions of the same registered custom components for designing different data processing pipelines over the stream analytics platform. By enabling versioning of the registered custom component, the users of the stream analytics platform may dynamically program the registered custom component which is available for use in real-time.

In one embodiment, the program file may comprise a program code to enable a user to design input configuration needed during the custom component's usage in a pipeline. For example, a DB processor component may have input configuration like host, port, database name, user, password, and alike. The component registering module 216 enables defining input configurations. Once the input configurations enables a secondary user to specify the input configuration such as host, port, database name, user, password, and alike at the time of adding the registered custom component into the pipeline.

At block 308, once the custom component is registered, the pipeline creation module 218 is configured to enable a palette and a canvas over Graphical User Interface (GUI) of the user devices associated with the primary user and the set of secondary users. The palette is configured to display a set of inbuilt components and the registered custom component. The canvas enables at least the primary user or the set of secondary users to drag and drop one or more components from the set of inbuilt components or the registered custom components for generating the distributed processing pipeline. The users may use different versions of the same registered custom component in order to design the distributed processing pipeline.

Figure 4:
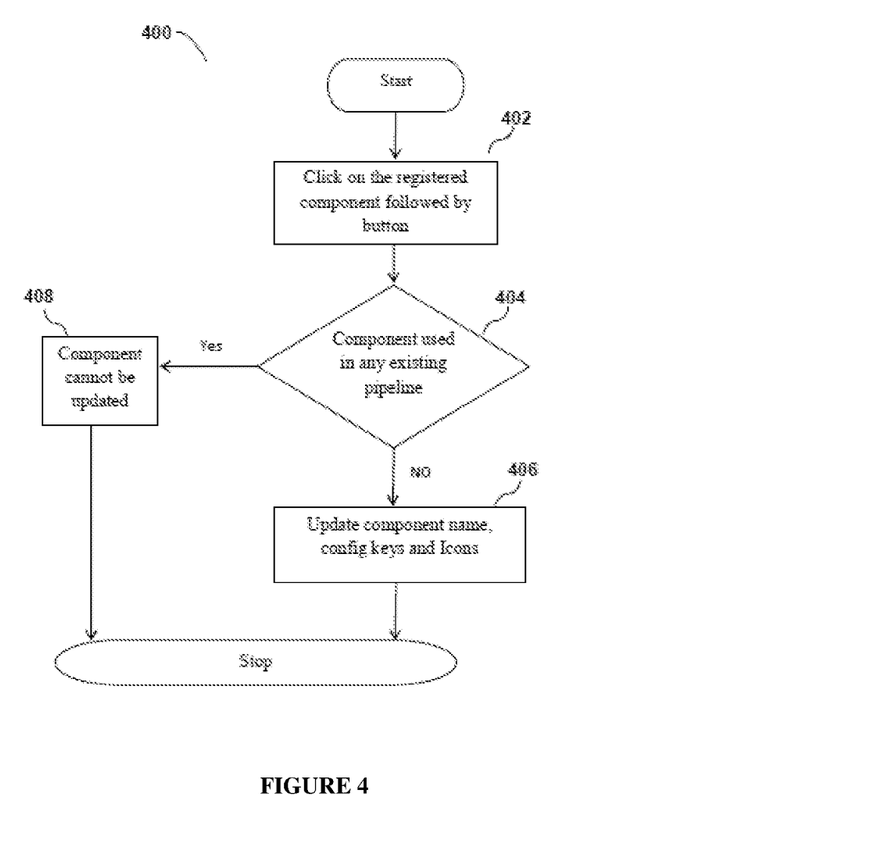
FIG. 4 illustrates a method for updating a registered custom component on a Stream Analytics Platform.

Referring now to FIG. 4, a method 400 for updating a registered custom component on Stream Analytics Platform is disclosed. The method 400 may be described in the general context of computer executable instructions. Generally, computer executable instructions can include routines, programs, objects, components, data structures, procedures, modules, functions, and the like, that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, an update component instruction may be received from a primary user or one of the secondary users in order to update a registered custom component.

At block 404, the component registration module 216 is configured to check whether the registered custom component is currently used in any existing distributed processing pipeline. If the registered custom component is used in any of the active distributed processing pipeline, the component registration module 216 displays an error message to the user.

At block 406, when the component registration module 216 determined that the registered custom component is not used in any of the existing distributed processing pipeline, the component registering module 216 is configured to enable the primary user of the one or more secondary users to update the registered custom component. The component registering module 216 may also enable updating the icon of the registered custom component. Further, once the registered custom component is updated, the component registering module 216 is configured to create a new version of the registered custom component.

At block 408, if the component registering module 216 identifies that the registered custom component is available in any existing distributed processing pipeline, the component registering module 216 is configured to display an error message that the registered custom component cannot be updated.

Figure 5:
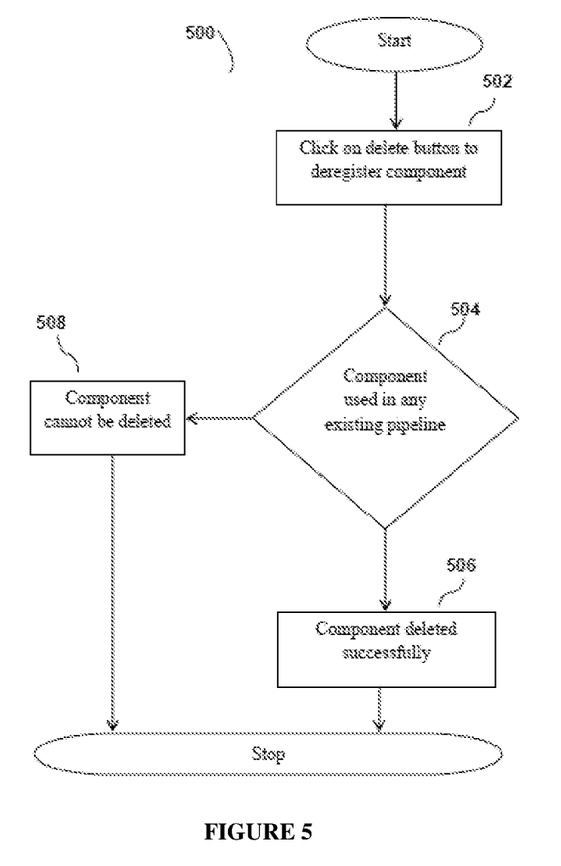
FIG. 5 illustrates a method for deleting a registered custom component on a Stream Analytics Platform.

Referring now to FIG. 5, a method 500 for deleting a registered custom component, of a distributed processing pipeline, on Stream Analytics Platform is disclosed. The method 500 may be described in the general context of computer executable instructions. Generally, computer executable instructions can include routines, programs, objects, components, data structures, procedures, modules, functions, and the like, that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented in the above described system 102.

At block 502, a component registration module 216 is configured to receive instructions to deregister the registered custom component, from the primary user of one of the secondary users.

At block 504, the component registration module 216 is configured to check whether the registered custom component is used in any existing distributed processing pipeline. In one embodiment, the component registration module 216 is configured to delete the registered custom component only when the registered custom component is not used in any of the distributed processing pipeline used in the stream analytics platform.

At block 506, when component registration module 216 identifies the registered custom component is not available in any existing distributed processing pipeline, the component registering module 216 is configured to delete the registered custom component. Further, once the registered custom component is deleted, the computer registering module 216 is configured to display a message that the registered custom component is deleted successfully.

At block 508, when the component registration module 216 determines that the registered custom component is available in any existing distributed processing pipeline, the component registering module 216 is configured to display a message that the registered custom component cannot be deleted.

Figure 6A:
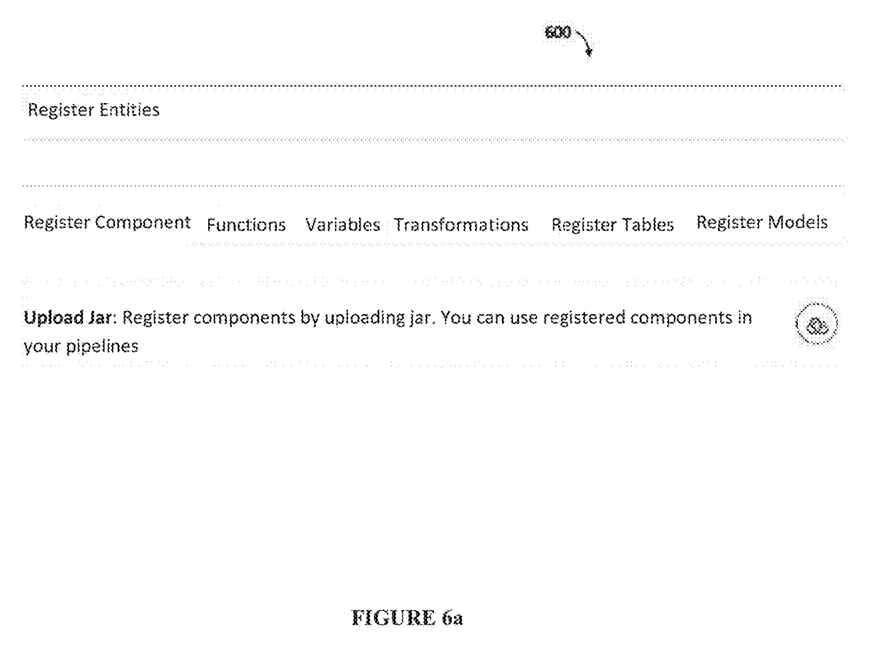
FIGS. 6a, 6b, 6c, and 6d illustrate an example of the method for registration of a custom component on a Stream Analytics Platform, in accordance with an embodiment of the present subject matter.
Figure 6B:
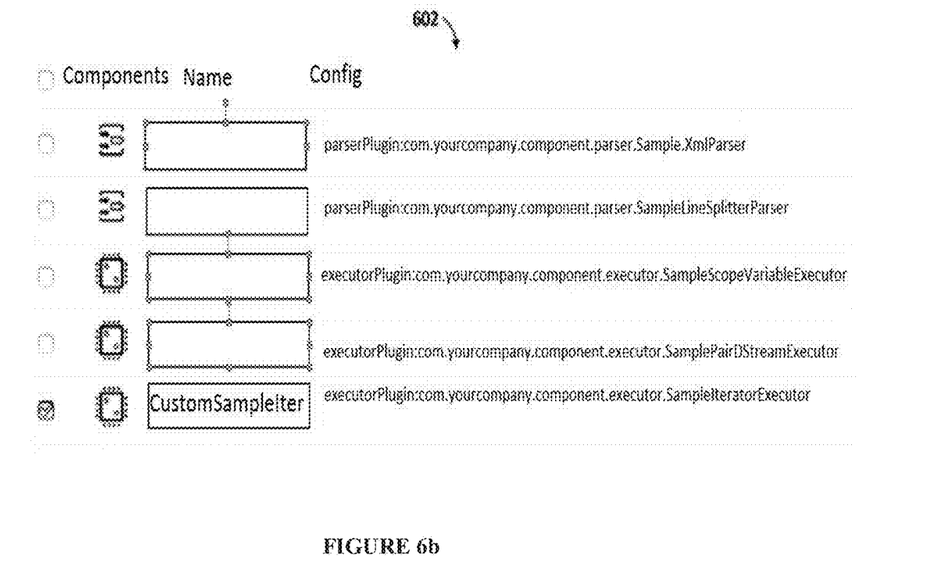
Figure 6C:
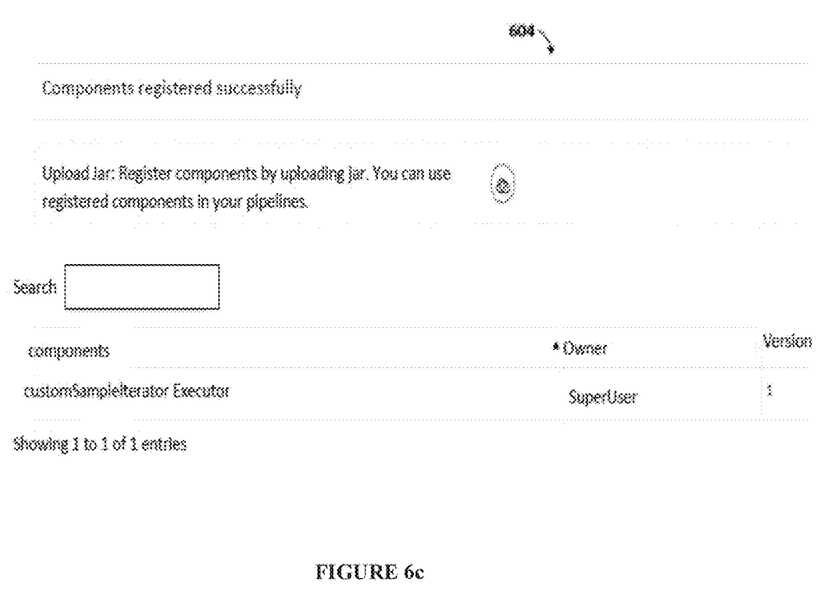
Figure 6D:
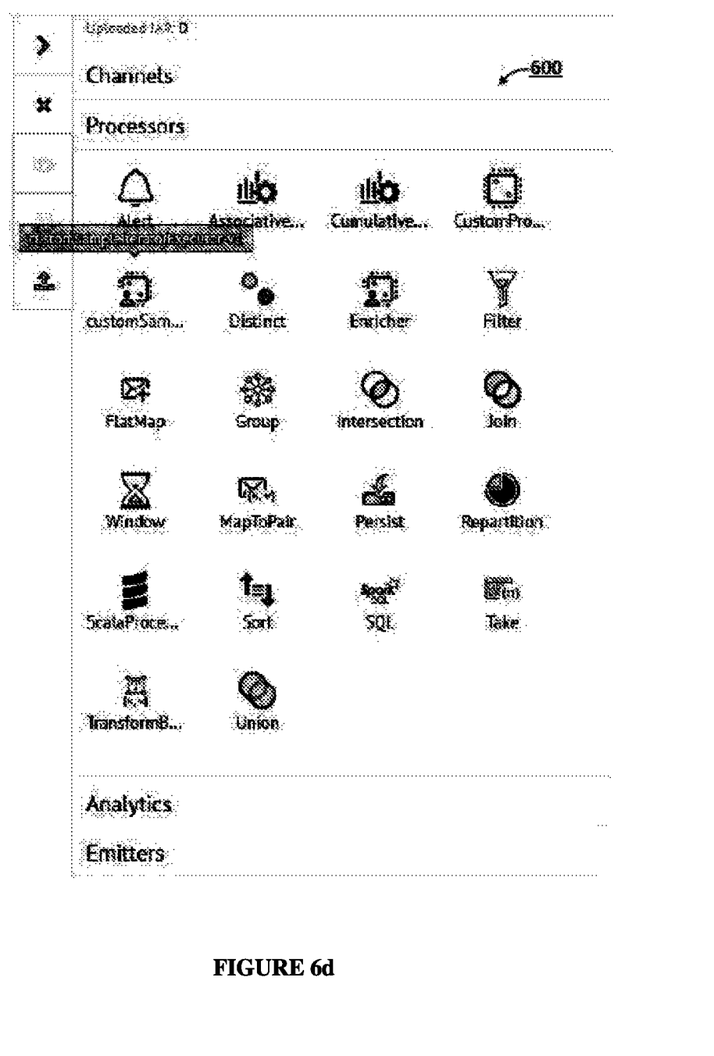

Referring now to FIGS. 6a, 6b, 6c, and 6d an example of the method for registration of a custom component on a Stream Analytics Platform have been described. Now referring to FIG. 6a, the system 102 may enable a register entity page 600 on the graphical user interface of the stream analytics platform 108 to enable the primary user to upload the program file associated with the custom component. In one embodiment, the program file may be configured to store multiple components to be registered with the stream analytics platform. Once the file is uploaded, in the next step, the parser module 214 may parse the program file and display all the components in the program file over an explorer page 602 as represented in FIG. 6b. Further the primary user may be prompted to select at least one component displayed over the explorer page 602. Further, the component registration module 216 is configured to register the one or more component(s) selected by the primary user and display a registration successful page 604 as disclosed in FIG. 6c. The registration successful page 604 may be configured to display details of the registered custom components including the owner and version of the registered custom components. Once the custom component is registered, in the next step, the pipeline generation module 218 may display the registered custom component in a pallet 606 disclosed in FIG. 6d. The primary user and the set of secondary users may access the pallet 606 and design the distributed processing pipelines using the registered custom component available in the pallet 606.

Although implementations for methods and systems for registration of a custom component on a Stream Analytics Platform have been described, it is to be understood that the appended claims are not necessarily limited to the specific features or methods described. Rather, the specific features and methods are disclosed as examples of implementations for registration of the custom component on the Stream Analytics Platform.

We claim:

1. A system for registration of a custom component on a stream analytics platform, the system comprising:
    a memory;
    a processor coupled with the memory, wherein the processor is configured to:
        receive a program file and one or more registration instructions corresponding to a custom component, from a primary user of a Stream Analytics Platform;
        parse the program file to retrieve a program code, of the custom component, from the program file;
        register the program code as a registered custom component, on the Stream Analytics Platform based on the one or more registration instructions,
        wherein the registered custom component is available over a Graphical User Interface (GUI) of the Stream Analytics Platform, wherein the registration instructions corresponds to one of:
  registering the custom component as a local component, whereby the local component is reconfigured to be available for access and use by the primary user, or
  registering the custom component as a global component, whereby the global component is reconfigured to be available for access and use by the primary user and a set of secondary users; and
enable at least one of the primary user or the set of secondary users of the Stream Analytics platform to use the registered custom component, based on the one or more registration instructions, for designing a distributed processing pipeline over the Stream Analytics platform.

2. The system of claim 1, wherein the program code corresponds to a set of classes, wherein the set of classes are retrieved by parsing the program file corresponding to the custom component.

3. The system of claim 1, further configured to enable a canvas and a palette over Graphical User Interface (GUI), wherein the palette is configured to display a set of inbuilt components and the registered custom component, and wherein the canvas enables at least one of the primary user or the set of secondary users to drag and drop one or more components from the set of inbuilt components or the registered custom components for generating the distributed processing pipeline.

4. The system of claim 1, wherein the Stream Analytics Platform is implemented over one of Apache™ Storm Platform or Apache™ Spark engine.

5. The system of claim 1, wherein the registered custom component is a channel component or a processor component, wherein the channel component is configured to read data from a set sources including a queues, distributed file system, TCP ports, and wherein the processor component is configured to implement user defined logic.

6. The system of claim 1, further configured to enable at least one of the primary user or the set of secondary users to update the program code corresponding to the registered custom component or delete the registered custom component.

7. The system of claim 6, wherein updating the program code, corresponding to the registered custom component, creates a new version of the registered custom component.

8. A method for registration of a custom component on a stream analytics platform, the method comprising:
  receiving, by a processor, a program file and one or more registration instructions corresponding to a custom component, from a primary user of a Stream Analytics Platform;
  parsing, by the processor, the program file to retrieve a program code, of the custom component, from the program file;
  registering, by the processor, the program code as a registered custom component, on the Stream Analytics Platform based on the one or more registration instructions,
  wherein the registered custom component is available over a Graphical User Interface (GUI) of the Stream Analytics Platform, wherein the registration instructions corresponds to one of:
    registering the custom component as a local component, whereby the local component is reconfigured to be available for access and use by the primary user, or
    registering the custom component as a global component, whereby the global component is reconfigured to be available for access and use by the primary user and a set of secondary users; and
  enabling, by the processor, at least one of the primary user or the set of secondary users of the Stream Analytics platform to use the registered custom component, based on the one or more registration instructions, for designing a distributed processing pipeline over the Stream Analytics platform.

9. The method of claim 8, wherein the program code corresponds to a set of classes, wherein the set of classes are extracted by parsing the program file corresponding to the custom component.

10. The method of claim 8, further configured to enable a canvas and a palette over Graphical User Interface (GUI), wherein the palette is configured to display a set of inbuilt components and the registered custom component, and wherein the canvas enables at least one of the primary user or the set of secondary users to drag and drop one or more components from the set of inbuilt components or the registered custom components for generating the distributed processing pipeline.

11. The method of claim 8, wherein the Stream Analytics Platform is implemented over one of Apache™ Storm Platform or Apache™ Spark engine.

12. The method of claim 8, wherein the registered custom component is a channel component or a processor component, wherein the channel component is configured to read data from a set of sources including a queues, distributed file system, TCP ports, and wherein the processor component is configured to implement user defined logic.

13. The method of claim 8, further configured to enable at least one of the primary user or the set of secondary users to update the program code corresponding to the registered custom component or delete the registered custom component.

14. The method of claim 13, wherein updating the program code, corresponding to the registered custom component, creates a new version of the registered custom component.

* * * * *